C. A. READ.
TRAP FOR STEAM PIPE.
No. 171,424.　　　　　　　　　　　Patented Dec. 21, 1875.
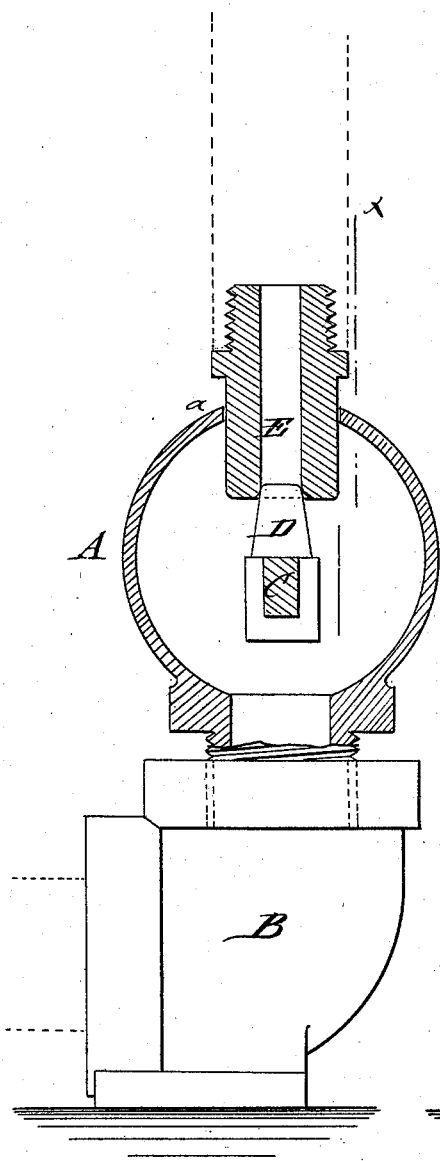
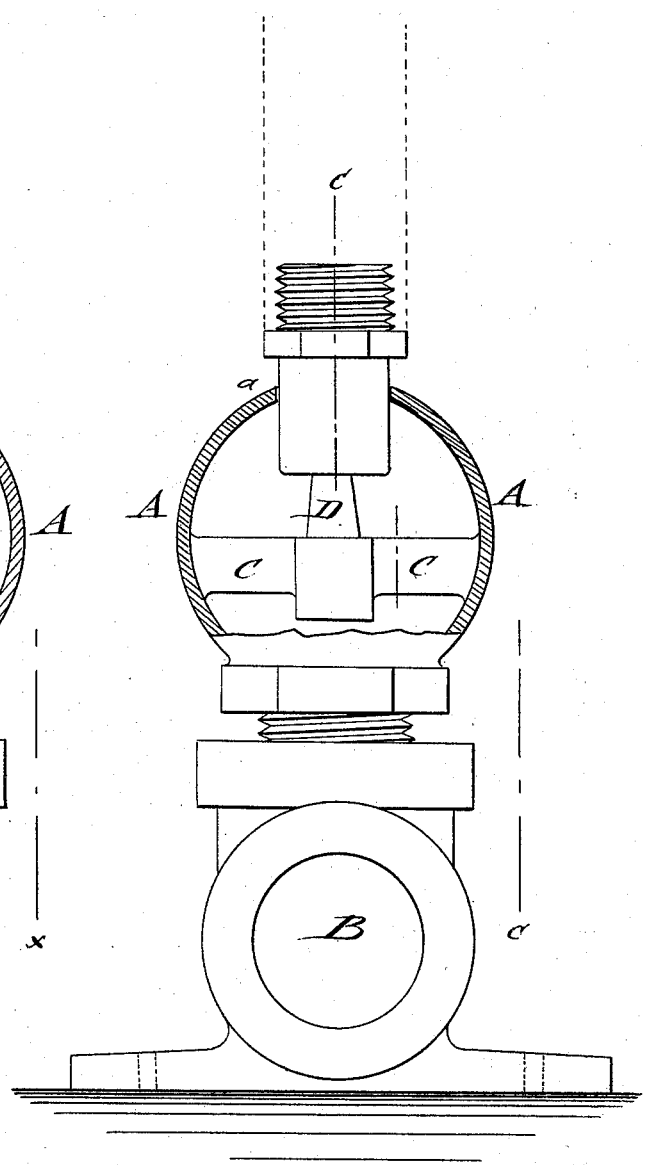
WITNESSES:　　　　　　　　　　　INVENTOR:
Chas. Nida　　　　　　　　　　　C. A. Read
Alex F. Roberts　　　　　　　　BY
　　　　　　　　　　　　　　　　ATTORNEYS.

UNITED STATES PATENT OFFICE.

CHARLES A. READ, OF BRIDGEPORT, CONNECTICUT.

IMPROVEMENT IN TRAPS FOR STEAM-PIPES.

Specification forming part of Letters Patent No. 171,424, dated December 21, 1875; application filed November 13, 1875.

*To all whom it may concern:*

Be it known that I, CHARLES A. READ, of Bridgeport, in the county of Fairfield and State of Connecticut, have invented a new and Improved Trap for Steam-Pipes, of which the following is a specification:

In the accompanying drawing, Figure 1 represents a vertical central section of my improved trap for steam-pipes on the line $c\ c$, Fig. 2; and Fig. 2, a vertical transverse section of the same on the line $x\ x$, Fig. 1.

Similar letters of reference indicate corresponding parts.

My invention relates to an improved steam-trap for thoroughly draining the water of condensation from steam-pipes for heating buildings without allowing the escape of steam; and the invention consists of an adjustably-seated globe, having an interior valve and top perforation for guiding a hollow plug screwed at the end of a drip-pipe that connects with the steam-pipes to be drained, the valve closing or opening the plug as the pipe is expanded or contracted by the heating or cooling of the pipe.

In the drawing, A represents the globe-shaped part of my trap for draining off the water of condensation from heating-pipes. The globe A is screwed into an elbow, B, that is securely fastened to the wall or floor by means of lugs and screws. A lateral bridge or bar, C, of the globe supports at the interior of the same a stationary valve, D, that is placed exactly into the vertical axis of the globe. The valve D is of conical shape, and rounded off at the upper edge. A hollow plug, E, is fitted into a central top perforation, $a$, of globe A, and to the valve D, so as to be closed by the same when seated thereon. The plug E is screwed into a drip-pipe of suitable length, that connects with the circulating steam-pipes to be drained of the water of condensation produced when the pipes are cooling. The globe A is adjusted exactly into position when the pipes are cold by being screwed up or down in the elbow until the valve opens sufficiently to allow the water to run out. When the steam is turned on to circulate into the heating-pipes the drip-pipe will be expanded thereby, so as to cause the plug to be seated tightly on the valve, preventing thereby the steam from escaping. When the steam is turned off the steam-pipes are gradually cooled off, and the drip-pipe will be contracted by the water of condensation collecting therein. The plug is thereby slightly raised from the valve, and the water of condensation allowed to escape.

The simple construction of the trap makes the same cheap and durable, and not liable to get out of order, securing regular action without the freezing up and bursting of the steam-pipes. After the globe has been adjusted to the exact degree required the action of the trap will be perfectly automatic and reliable, producing the positive opening and closing of the valve by the contraction and expansion of the drip-pipe.

Having thus described my invention, I claim as new and desire to secure by Letters Patent—

In traps for steam-pipes, the globe A, made movable around the plug E, and in a threaded socket of elbow B, as shown and described, whereby the relative position of valve to seat may be gaged.

CHARLES A. READ.

Witnesses:
F. J. SEDGWICK,
R. B. LACEY.